US006801285B1

United States Patent
Shi et al.

(10) Patent No.: US 6,801,285 B1
(45) Date of Patent: Oct. 5, 2004

(54) THIN CELL GAP MICRODISPLAYS WITH OPTIMUM OPTICAL PROPERTIES

(75) Inventors: Hongqin Shi, San Jose, CA (US); Mary Lou Jepsen, Sausalito, CA (US)

(73) Assignee: Microdisplay Corporation, San Pablo, CA (US)

( * ) Notice: Subject to any disclaimer, the term of this patent is extended or adjusted under 35 U.S.C. 154(b) by 0 days.

(21) Appl. No.: 10/341,677

(22) Filed: Jan. 14, 2003

Related U.S. Application Data

(63) Continuation of application No. 09/960,160, filed on Sep. 20, 2001, now abandoned.

(51) Int. Cl.[7] .............................................. G02F 1/1337
(52) U.S. Cl. ...................... 349/128; 349/127; 349/123; 349/129; 349/132; 349/177
(58) Field of Search .................................. 349/128, 127, 349/129, 123, 132, 177

(56) References Cited

U.S. PATENT DOCUMENTS

| | | | |
|---|---|---|---|
| 4,595,259 A | * 6/1986 | Perregaux | 349/3 |
| 5,593,802 A | 1/1997 | Sato et al. | 430/20 |
| 5,742,373 A | 4/1998 | Alvelda | 349/204 |
| 5,841,497 A | * 11/1998 | Sato et al. | 349/128 |
| 5,850,273 A | * 12/1998 | Terashita et al. | 349/129 |
| 5,859,682 A | * 1/1999 | Kim et al. | 349/124 |
| 5,920,298 A | 7/1999 | McKnight | 345/87 |
| 5,940,159 A | 8/1999 | Alvelda | 349/202 |
| 6,144,433 A | * 11/2000 | Tillin et al. | 349/123 |
| 6,222,677 B1 | 4/2001 | Budd et al. | 359/630 |
| 6,300,992 B1 | 10/2001 | Fujimaki et al. | 349/128 |
| 6,384,885 B1 | * 5/2002 | Kim et al. | 349/113 |
| 6,419,363 B1 | * 7/2002 | Ho et al. | 353/20 |
| 6,437,915 B2 | * 8/2002 | Moseley et al. | 359/465 |
| 6,493,058 B1 | * 12/2002 | Han | 349/155 |
| 6,515,729 B1 | * 2/2003 | Hoshino | 349/158 |

OTHER PUBLICATIONS

K. Seunarine et al., *Techniques to Improve the Flatness of Reflective Micro–Optical Arrays*, 1999, pp. 18–27.

M.L. Jepsen et al., *0.9" SXGA Liquid Crystal on Silicon Panel with 450 Hz. Field Rate*, Microdisplays, Aug. 15, 2001, pp. 1–4; Society of Information Display.

*Field Sequential Color Evaluation Kit Version 3.0*, The MicroDisplay Corporation, Feb., 2000.

Schluck et al., *Post–processing and Assembly of Reflective Microdisplays*, pp. 93–101, Journal of the SID 7/2, 1999.

* cited by examiner

Primary Examiner—Tom Thomas
Assistant Examiner—Eugene Lee

(57) ABSTRACT

A projection mode microdisplay includes a silicon substrate having disposed thereon a first alignment layer having a first alignment direction, and a cover substrate having disposed thereon a second alignment layer having a second alignment direction. A liquid crystal material having spacers disbursed therethrough is disposed between to maintain the cell gap which is about 1.2 microns. The first and second alignment directions form about a 27 degree twist angle. An electrode disposed on the cover substrate and the silicon substrate are connected to a control system that sequentially applies an electric field across the cell gap to control the orientation of the liquid crystal material. A retarder is disposed on the cover substrate and has an alignment direction that is at −38 degrees ±5 degrees with respect to an x-axis of the display, wherein the liquid crystal material has a turn-on time no greater than 1.0 milliseconds and a turn-off time no greater than 4.0 milliseconds. The foregoing microdisplay has a contrast ratio of at least up to 2000:1, and a polarization conversion efficiency of at least 94%. A similar construction for a near-eye mode microdisplay utilizing a comparable thin cell gap can also be used.

13 Claims, 9 Drawing Sheets

THIN CELL GAP MICRODISPLAYS WITH OPTIMUM OPTICAL PROPERTIES

This application is a continuation of Ser. No. 09/960,160 filed Sep. 20, 2001, now abandoned.

TECHNICAL FIELD

This invention relates to liquid crystal microdisplays. More particularly, this invention relates to microdisplays utilizing liquid crystal material disposed on a silicon substrate. Specifically, this invention relates to liquid crystal material captured between a silicon substrate and a clear substrate with a cell gap of less than 1.5 microns and vastly improved operating properties.

BACKGROUND ART

Microdisplays are generally classified as flat-panel displays that are under three inches in diagonal. These displays have a pixel density of about 800×600 and some are even as large as 4000×2000. Microdisplays are used in two different types of applications. One is a projection-type microdisplay, wherein optics magnify an image on the microdisplay for projection onto a screen. Such displays are used in front projection systems, high-definition television, data monitors, simulation systems, and the like. Another type of microdisplay application is a "virtual" display for near-eye use. In these types of systems, an image is magnified in a device so that it appears much larger than in reality. These displays are used as monitors for miniaturized personal computers, cell phones, eyepieces, personal digital assistant displays, and the like.

Either of the foregoing devices can be manufactured utilizing silicon substrates and a liquid crystal material, wherein the silicon substrate provides the control electronics for modulating the liquid crystal material to a desired state for producing an image. For reflective displays, external light sources such as red, green, and/or blue light emitting diodes or, in some instances, color lasers are projected onto the display which is concurrently modulated. As a result, a full-color image is generated.

There are several types of known reflective microdisplays, each of which has its advantages and drawbacks. These displays basically employ complex variations of a twisted nematic liquid crystal cell. As is well known in the art, a twisted nematic liquid crystal cell includes two opposed substrates, each of which has an electrode disposed thereon. Polarizers are typically used with these cells to obtain the desired optical effect. The glass surfaces of the opposed substrates are treated so that the liquid crystal molecules lie parallel to the surface, wherein one substrate aligns the liquid crystal molecules in one direction and the other substrate aligns the material in an orthogonal direction. Accordingly, the nematic liquid crystal molecules are forced to twist through an angle of 90° within the cell. This produces rotation of the polarized light as it propagates through the cell. The polarization direction of light is therefore rotated 90°, whereupon the light passes through a polarizer on the other substrate. Behind the second polarizer is typically a reflector that causes the light to traverse back through the cell. Accordingly, the light is rotated back 90° by the liquid crystal so that it passes through the top polarizer and then emerges from the cell. In this state, the cell adopts the color of the reflector which is usually silver. When a voltage is applied across the cell, the nematic liquid crystal material prefers to align parallel to the electric field. If the voltage is high enough, the liquid crystal molecules change from a twist configuration to a deformed state and the polarization direction of light traversing through the cell is rotated only slightly, meaning that almost all of the light that passes through the top polarizer cannot get through to the bottom polarizer. Since no light is reflected back out of the cell, areas with an applied voltage appear dark in contrast to areas without an applied voltage that appear silver. Removal of the voltage from any area causes relaxation of the material back to the twisted configuration and the display again appears silver.

In reflective microdisplays, the back substrate, the back polarizer, and the reflector are replaced with a silicon substrate and the other parameters of the cell are selected to coact with one another to provide optimum performance.

One variation of a liquid crystal microdisplay is called the 45° twist mode. This mode has a 45° twist angle, wherein the silicon substrate is provided with an alignment layer of 0°, while the top layer is provided with an alignment layer of about 45°. The advantages of this mode are its normally black mode, good contrast at achievable voltages, and relative ease of manufacturing. Unfortunately, this mode is relatively slow (10–20 milliseconds) and is very sensitive to cell gap distortions in the dark state. And separate liquid crystal cells are required to produce red, green, and blue colors. This tends to distort the overall appearance of a color image. The additional panels increase the cost of the display and the circuitry for modulating the panels is quite complex. This type of cell has a simulated contrast of about 270:1. Here, and elsewhere in this document, contrast ratio is defined in a telecentric optical system with light rays impinging on the display over a cone of angles ranging up to +/−22.5 degrees, in other words an F#/1.0 telecentric optical system. In addition, such a system uses full-spectrum visible illumination. In other words, white light, or light with wavelengths ranging from 400 nanometers to 700 nanometers.

Another type of display is referred to as a reflective twisted nematic which uses a negative 52° twist and only a single polarizer as opposed to crossed polarizers. This mode operates much the same as the 45° twist mode and so its operating characteristics are nearly the same as the previous mode. Both of these modes have a cell gap of about 2.6 microns.

One type of mode which has shown some promise is the Pi liquid crystal mode. Such a cell has a cell gap of about 1.5 microns and utilizes a polarizer with a 45° angle. The alignment on the liquid crystal on the top of the glass and bottom substrate is 0° and a compensation film with an effective retardance thickness of 35 nanometers and a 90° angle is utilized. The cell utilizes a critical voltage, above which the liquid crystal material is in a bending alignment state and below which the splay mode is more stable. Accordingly, a bias voltage is always required to keep the cell in a bending mode and the critical voltage for the cells is specified as being above 1.32 volts. A polarization conversion efficiency of about 98% can be obtained with this mode. Simulated and measured speeds of the turn-on times for such a cell is 0.6 milliseconds, whereas turn-off times are about 2.7 milliseconds, both of which are relatively good. Unfortunately, the viewing angle and contrast ratio achievable with this mode are limited. The simulated contrast is about 400:1 and it is below 100-to-1 outside the incidence angle of 10°. To increase the view angle, another compensation film called a wide view film must be applied.

Yet another mode is the electrically controlled birefringence mode. The cell construction of such a cell is similar to the Pi cell, the only difference being that the alignment direction on one substrate is 180°. A 1.5 micron cell gap is utilized, along with a 45° polarizer. Also a compensation film with an effective retardance thickness of 35 nanometers at 90° is utilized. The reflectance of this cell is very similar to a Pi cell and the light and dark state voltages are a little bit lower in the electrically controlled birefringence mode than those in the Pi cell. Driving voltages are between 1.89 volts and 6.03 volts. The measured contrast for such a cell is 384:1.

A thin, reflective mode using a 45° twist is known to be used on reflective substrates with a 0.2 millisecond switch to black time, but the achievable contrast is limited to 200:1 as measured photoptically from 400–700 nanometers. Other reflective modes involve vertically aligned nematic liquid crystals with 16 millisecond switch times. However, none of these modes can now provide optimal optical properties characterized in the critical areas of contrast, response time, and polarization conversion efficiency while also utilizing minimal operating voltages.

DISCLOSURE OF INVENTION

It is thus an object of the present invention to provide a thin cell gap microdisplay which exhibits optimal optical properties.

It is another object of the present invention to provide a microdisplay, as above, in which the response times are at least faster than 5.0 milliseconds from either bright to dark or dark to bright states.

It is a further object of the present invention to provide a microdisplay, as set forth above, wherein the display comprises a silicon substrate opposed by a cover substrate with a cell gap of about 1.5 microns or less therebetween to allow for low voltage operation.

It is yet another object of the present invention to provide a microdisplay, as set forth above, which is used in a projection mode.

It is still another object of the present invention to provide a projection mode microdisplay, as set forth above, wherein an alignment layer is provided on the silicon substrate at an alignment angle of about +53° and wherein an alignment layer is provided on the cover substrate at an alignment angle of about +26°, resulting in a twist angle of about 27° when a nematic liquid crystal material is disposed therebetween.

It is still another object of the present invention to provide a projection mode microdisplay, as set forth above, wherein a retarder is disposed on the cover substrate and has an orientation of about −38°.

It is still a further object of the present invention to provide a projection mode microdisplay, as set forth above, which has a contrast ratio of at least greater than 400:1 and up to 2,000:1 and a polarization conversion efficiency of up to 94% when used with #F/2.5 optical system with white light illumination.

It is an additional object of the present invention to provide a projection mode microdisplay, as set forth above, wherein the response time from a bright state to a dark state is about 0.2 milliseconds, and wherein the response time from the dark state to a bright state is less than about 1.5 milliseconds.

It is still yet another object of the present invention to provide a microdisplay, as set forth above, which is used in a near-eye mode.

It is yet a further object of the present invention to provide a near-eye mode microdisplay, wherein the alignment on the silicon substrate is about +80°, and wherein the alignment layer on the cover substrate is about −15°, resulting in a twist angle of about 95° when a nematic liquid crystal material is disposed therebetween.

It is still yet an additional object of the present invention to provide a near-eye mode microdisplay, as set forth above, wherein the resulting display has a contrast ratio of up to 100:1 and a polarization conversion efficiency of greater than 50%.

It is still yet another object of the present invention to provide a near-eye mode microdisplay, as above, in which the response times are at least faster than 5.0 milliseconds.

The foregoing and other objects of the present invention, which shall become apparent as the detailed description proceeds, are achieved by a microdisplay including a silicon substrate having disposed thereon a first alignment layer having a first alignment direction, a cover substrate having disposed thereon a second alignment layer having a silicon substrate having disposed thereon a first alignment layer having a first alignment direction, a cover substrate having disposed thereon a second alignment layer having a second alignment direction, the alignment layers facing one another to form a cell gap, and a liquid crystal material disposed between the silicon substrate and the cover substrate, the first and second alignment directions having about a 27 degree ±5 degree angle therebetween.

Other aspects of the present invention are attained by a microdisplay including a silicon substrate having disposed thereon a first alignment layer having a first alignment direction, a cover substrate having disposed thereon a second alignment layer having a second alignment direction, the alignment layers facing one another to form a cell gap, and a liquid crystal material having spacers disbursed therethrough to maintain the cell gap, the material disposed between the silicon substrate and the cover substrate, the first and second alignment directions having about a 27 degree ±5 degree angle therebetween, wherein the first alignment direction is 53 degrees ±5 degrees with respect to an x-axis of the display, and wherein the second alignment direction in +26 degrees ±5 degrees with respect to the x-axis, and wherein the cell gap is about 1.2 microns ±0.2 microns.

Still another object of the present invention is attained by a microdisplay including a silicon substrate having disposed thereon a first alignment layer having a first alignment direction, a cover substrate having disposed thereon a second alignment layer having a second alignment direction, the alignment layers facing one another to form a cell gap, and a liquid crystal material having spacers disbursed therethrough to maintain the cell gap, the material disposed between the silicon substrate and the cover substrate, the first and second alignment directions having about a 95 degree ±3 degree angle therebetween.

Yet further aspects of the present invention are attained by a microdisplay including a silicon substrate having disposed thereon a first alignment layer having a first alignment direction, a cover substrate having disposed thereon a second alignment layer having a second alignment direction, the alignment layers facing one another to form a cell gap, and a liquid crystal material disposed between the silicon substrate and the cover substrate, wherein the cell gap is less than about 1.4 microns.

These and other objects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1A:
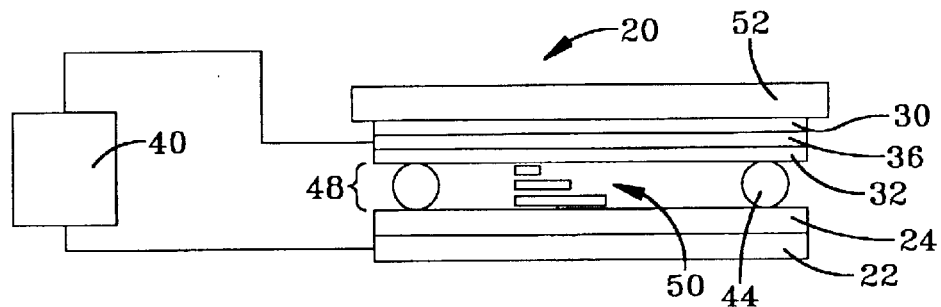
FIG. 1A is an elevational schematic view of a projection mode microdisplay.
Figure 1B:
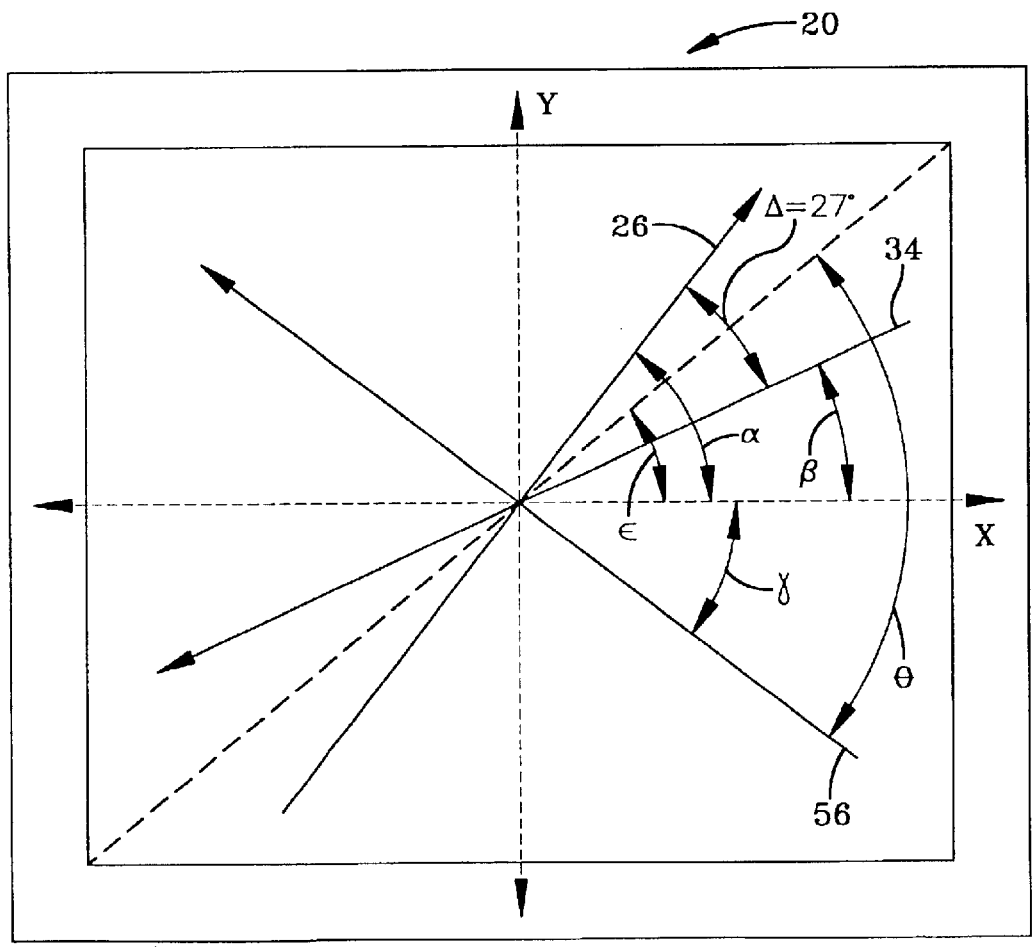
FIG. 1B is a schematic representation of alignment angles for the projection mode microdisplay.

Referring now to the drawings and, in particular, to FIGS. 1A and 1B, the liquid crystal microdisplay, in a projection mode, is indicated generally by the numeral 20. Generally, a projection-type microdisplay is a reflective display in which color and/or light impinges upon the display and is reflected to various optical elements for display on a larger screen. The projection mode optimally operates at a temperature of about 45–55° C., although it is believed that the display can operate over a much wider temperature range. The manner in which the microdisplay picture elements are modulated controls the colors presented and the speed with which the display operates.

The microdisplay 20 includes a silicon backplane 22 which includes active matrix electronics utilized for controlling each pixel of the display. The silicon backplane 22 is fabricated in much the same fashion as CMOS electronics in a silicon foundry. In order to obtain the preferred construction of the backplane 22, steps must be taken to ensure the planarity or flatness of the backplane. It is desirable to have a planarity measurement of ±0.1 µm or better across the area of the backplane 22. The ability to obtain such flatness is taught in U.S. Pat. No. 5,593,802 entitled "Method Of Forming A Spacer For Use In A Liquid Crystal Panel," in the article by Seunarine et al. *Techniques to improve the flatness of reflective micro-optical arrays sensors and actuators* A V78 1999, pages 18–27; and in the article by M. Schluck entitled *Post-Processing And Assembly Of Reflective Microdisplays*, Journal of SID, 1998, pages 1–27, all of which are incorporated herein by reference.

Disposed on the backplane 22 is a backplane alignment layer 24, which is typically a material such as Nissan SE7492 and having a coating thickness anywhere from 100A–500A. The backplane alignment layer 24 has an alignment direction 26 designated by the angle α which is at +53° plus or minus 5° with respect to an x-axis as shown in FIG. 1B.

Positioned opposite the backplane 22 is a cover substrate 30. In the exemplary embodiment, the substrate 30 is a glass material provided by Corning, part number 1737F. The glass thickness is typically about 0.70 millimeters. Of course, other equivalent-type glass, plastic or optically equivalent substrates may be used. In any event, the substrate 30 has an alignment layer 32 which utilizes the same materials and thicknesses as described for the backplane alignment layer. The alignment layer 32 has an alignment direction 34 which is 26° plus or minus 5° with respect to the x-axis and is designated generally by the angle β. Both the alignment layers 24 and 34 in their respective directions may be obtained by the conventionally known mechanical rubbing process, such as utilization of a velvet cloth which is brushed across the glass or silicon substrate to bring about a characteristic alignment necessary for the liquid crystal material. Other methods for obtaining an alignment layer such as non-contact alignment may be used. Such methods may use precisely controlled laser beams of light that subject the substrates to holographic exposure. In other words, two coherent beams of light are directed at the substrates which are coated with a chemical that reacts very predictably to the carefully regulated laser light. Other methods known in the art may also be employed to obtain the desired alignment angles. Disposed between the alignment layer 32 and the substrate 30 is a substrate electrode 36.

A control electronics system 40 is connected to the electrode 36 and to the backplane 22 to facilitate the application of voltages therebetween. Disposed between the substrate and the backplane 22 are a plurality of spacers 44 that are sized to about 1.2 microns in diameter. These spacers are applied to the backplane in a conventional manner and function to form a cell gap 48. The spacers can optionally be omitted, however, a uniform cell gap may be more difficult to realize. The use of spacers is necessary to correct for sagging glass and nonflat silicon. Thicker glass and flat silicon may allow spacers to be omitted from this construction. In the preferred embodiment, the obtained cell gap is 1.2 microns plus or minus 0.2 microns. Disposed between the backplane 22 and the substrate 30 is a liquid crystal material 50. Any number of nematic liquid crystal formulations may be used, but a preferred material is active matrix LC MLC-6849-100 which may be doped with a chiral compound such as MLC-6247. As those skilled in the art will appreciate, the chiral compound ensures that all the nematic liquid crystal material rotates in the same direction with respect to the alignment layers. The edges of the display are sealed in a conventional manner.

A retarder 52 is disposed on the substrate 30 on the opposite side of the cell gap 48. A retarder compensates for the residual birefringence in a liquid crystal material. The retarder 52 has an optical birefringence of about 22 nm. It has been found that orienting the retarder at angle 56, designated by γ, at −38° plus or minus 5° with respect to the x-axis, is effective in contributing to the optimal properties for the projection mode microdisplay. The retarder provides a net birefringence equal to the birefringence of the display so that the desired properties can be obtained. The birefringence of the display results from two layers of the display with the strong anchoring energy. One of those layers is next to the reflective electrode at the bottom, opaque backplane 22 and the other layer is next to the top electrode of the substrate 30.

It will be appreciated that the foregoing alignment angles are measured with respect to the x-axis which also serves as the polarization axis of the incoming light. And, the microdisplays disclosed herein utilize "on-axis" illumination wherein the illuminating light source generates polarized light. If needed, a polarizer could be placed over the display. In other words, the illumination is centered exactly perpendicular to the microdisplay. In actual use, a cone of light (up to +/−25 degrees from perpendicular) impinges on the microdisplay. The image generated by a projection mode microdisplay is ultimately projected onto a diffuse screen which scatters the light in all directions so that the image is viewable from most any angle.

From the foregoing, it can be determined that a twist angle $\Delta$ is equal to the angle $\alpha$ minus the angle $\beta$ to equal a twist angle of about 27° plus or minus 5°. From this determination of $\Delta$, a median twist angle $\epsilon$ can be determined which is at about a midpoint of the twisting between angle $\alpha$ and angle $\beta$. Accordingly, a relationship can be established between the orientation of the twist angle $\Delta$ with respect to the retarder angle which is essentially $\epsilon$ minus $\gamma$ to equal $\theta$ to equal about 78.5° plus or minus 5°.

The foregoing projection mode microdisplay 20 has been tested and found to have the following optimum properties. In particular, the display can operate with a low voltage of about 5 volts or less while providing a high contrast of up to 2,000:1 over an F#/2.8 cone angle with full visible spectrum of white light. The display also provides excellent switching speeds, wherein a bright to dark state can be obtained in about 0.2 milliseconds and wherein a dark to bright state can be switched in about 1.46 milliseconds. Such a mode has been found to have a 94% polarization conversion efficiency. Polarization efficiency can be defined as the amount of light input in one polarization that gets converted into the output polarization. For example, when 100% P-polarized light impinges on the cell, the projection mode converts 94% of that light into an S-polarization as output. It is believed that the 6% of light that is lost is absorbed into the substrates, backplane, and other components of the cell. It will be appreciated that as the cell gap changes, so does the polarization conversion efficiency of the mode.

Figure 2:
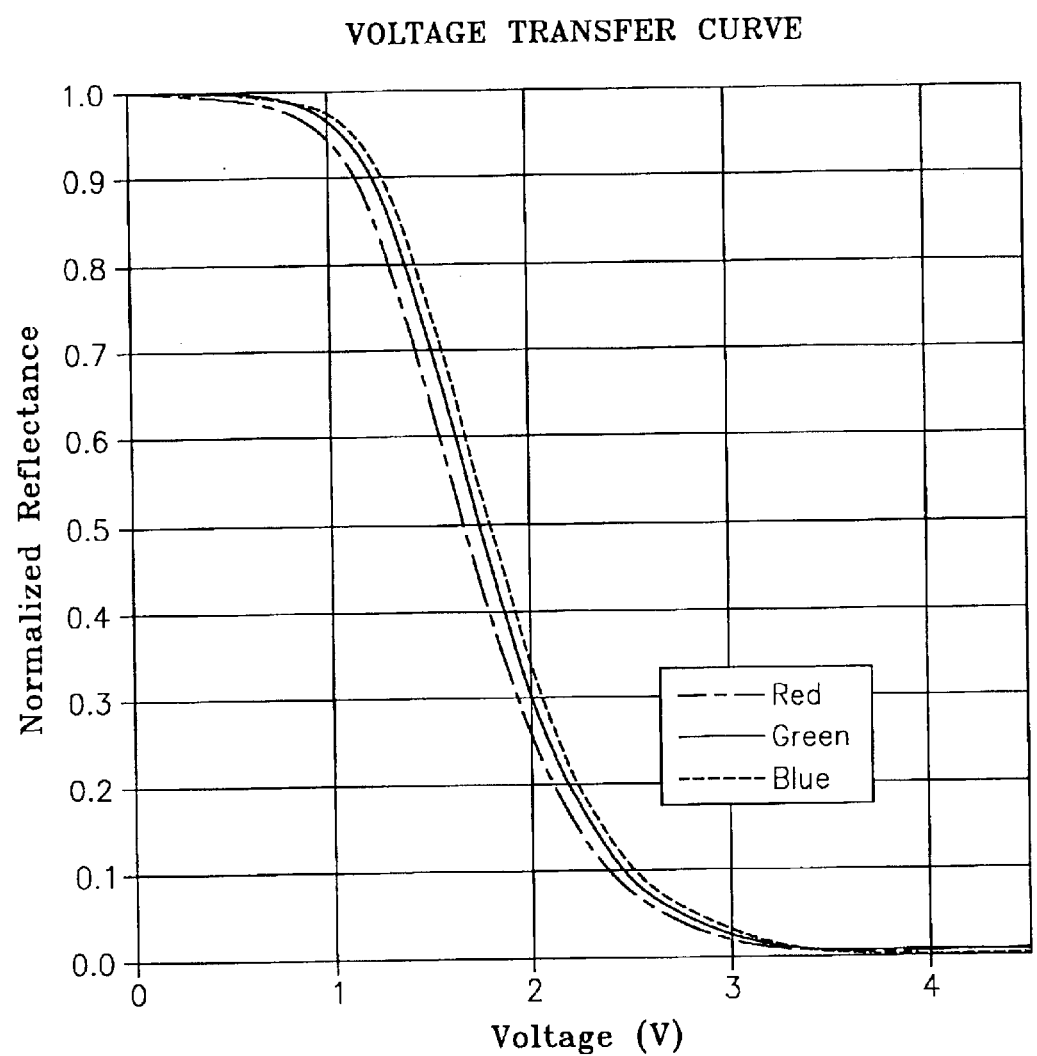
FIG. 2 is a voltage transfer curve of the projection mode microdisplay.
Figure 3:
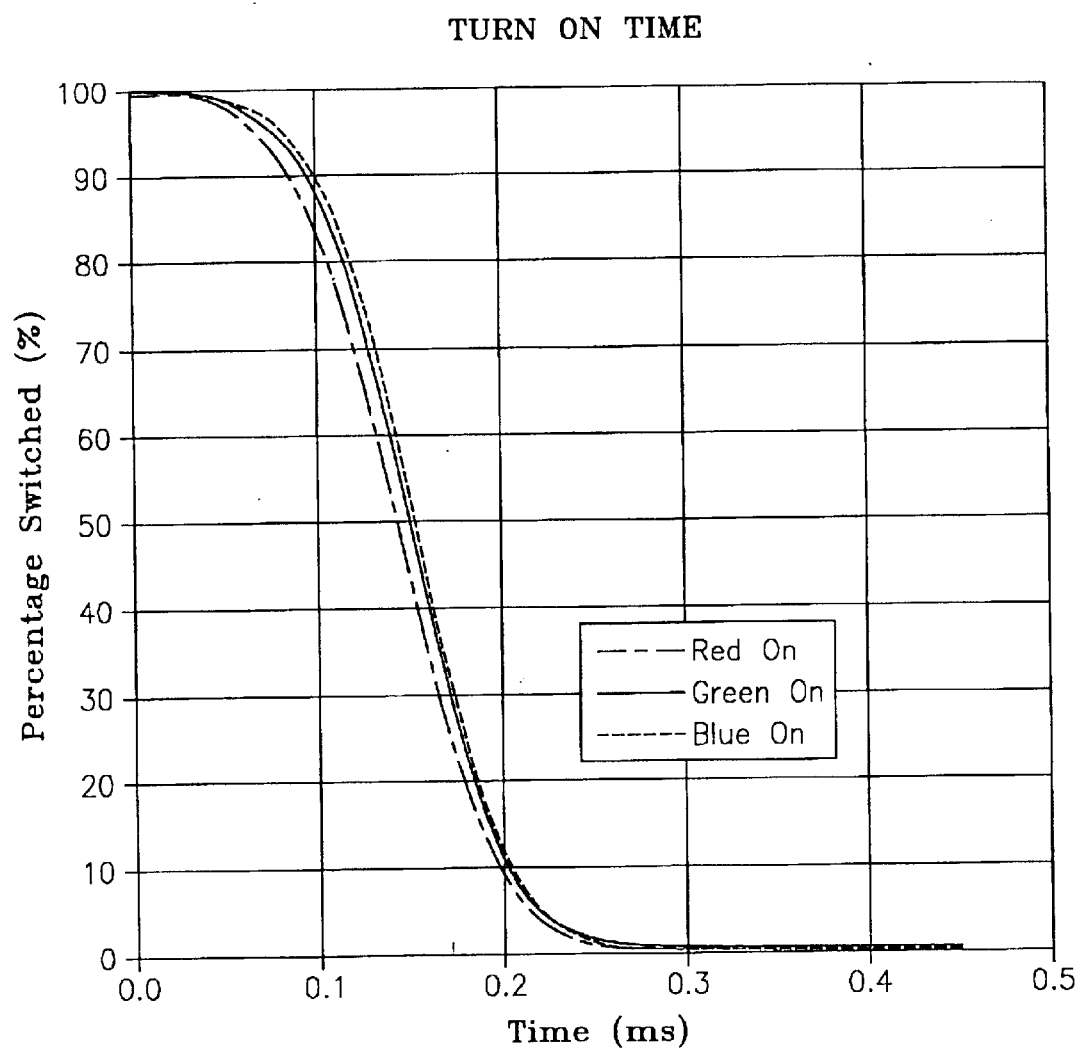
FIG. 3 is a graphical representation of the turn-on time for the projection mode microdisplay.
Figure 4:
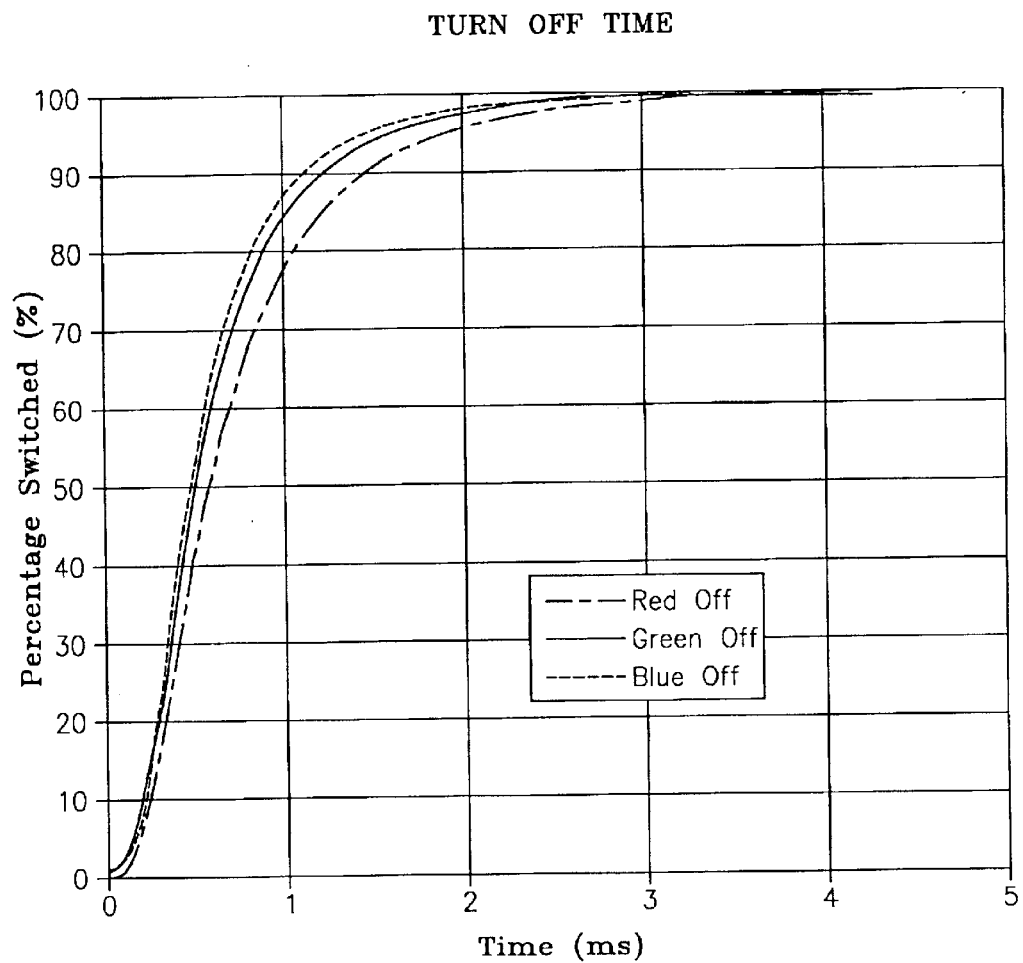
FIG. 4 is a graphical representation of the turn-off time for the projection mode microdisplay.

With the above description, reference is made to FIGS. 2–4 which show the measured properties of an exemplary projection mode display. In particular, FIG. 2 shows a voltage transfer curve of the 27° twist cell with a 22 nm retarder film. FIG. 3 shows that the turn-on time from 0–4.5 volts at room temperature is achievable in about 0.2 milliseconds. A turn-off time can be obtained at about less than 1.5 milliseconds as shown in FIG. 4. As used herein, turn-on and turn-off times are measured when 90% of the liquid crystal material is switched to the desired state.

While not wanting to be bound by theory, it is believed that the combination of the thin cell gap, the twist angle, and the angular relationship between the retarder and the twist angle of the twisted nematic liquid crystal material coacts to allow for the improved contrast ratio, fast switching times, and the polarization conversion efficiency. Such properties in a single display have heretofore been unknown in the art and it is believed that this construction is a significant improvement over the art.

Figure 5A:
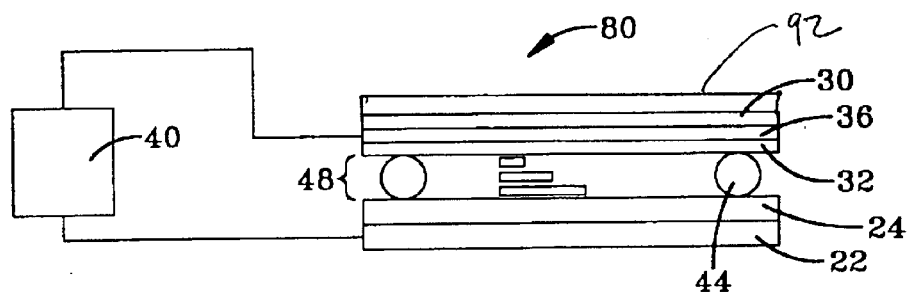
FIG. 5A is an elevational schematic view of a near-eye mode microdisplay.
Figure 5B:
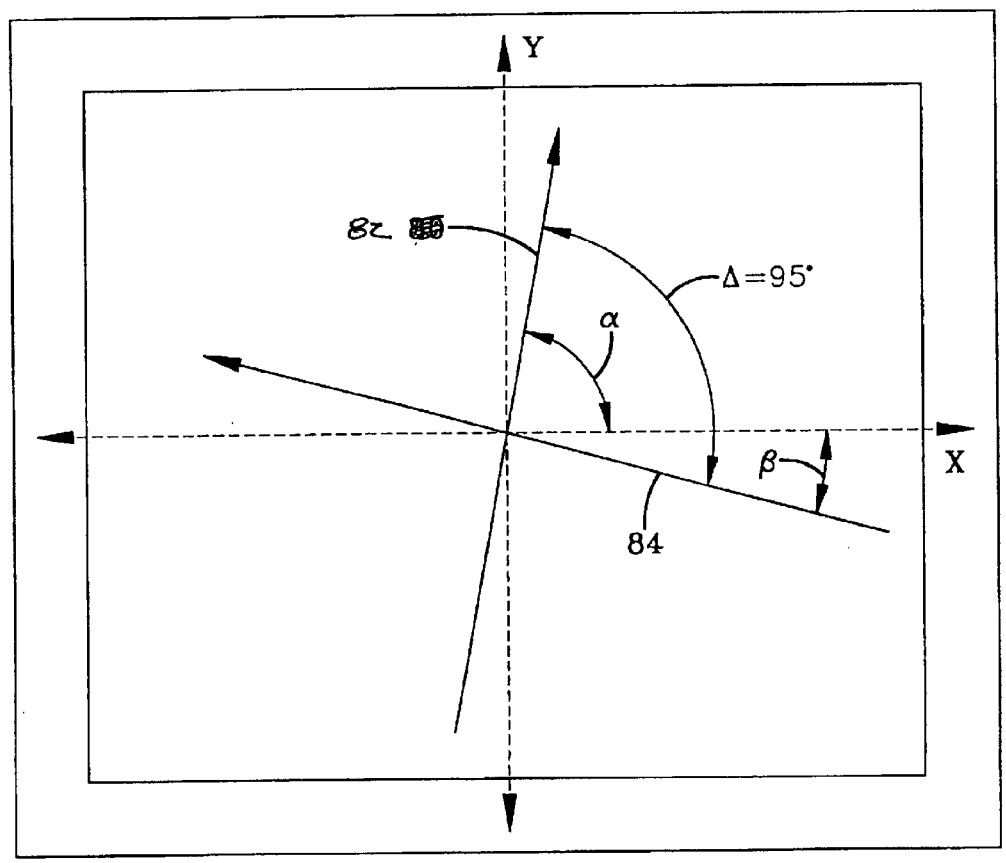
FIG. 5B is a schematic representation of alignment angles for the near-eye mode microdisplay.

In another embodiment known in FIGS. 5A and 5B, a near-eye mode microdisplay is designated generally by the numeral 80. This mode employs some of the same features of the projection mode and, in particular, the thin cell gap of 1.2 $\mu$m ±0.2 $\mu$m as discussed above. The microdisplay 80 includes the backplane 22 and the backplane alignment layer 24. In this embodiment, the backplane alignment layer has an alignment direction 82 that is +80° plus or minus 5°, angle $\alpha$. A substrate 30 having an alignment layer 32 is disposed opposite the backplane 22 in much the same manner as previously described, wherein the alignment layer 32 has an alignment direction 84 of −15° plus or minus 5°, angle $\beta$. As in the previous embodiment, an electrode 36 is disposed between the substrate 30 and the alignment layer 32, wherein the electrode 36 and the backplane 22 are connected to the control electronics system 40. Spacers 44, as in the previous embodiment, may be employed between the backplane 22 and the substrate 30 to form a cell gap 88 in which liquid crystal material 50 is disposed therebetween. Based upon the foregoing, alignment directions 82 and 84, it will be appreciated that a twist angle $\Delta$ of 95° plus or minus 5° is obtained.

Figure 6:
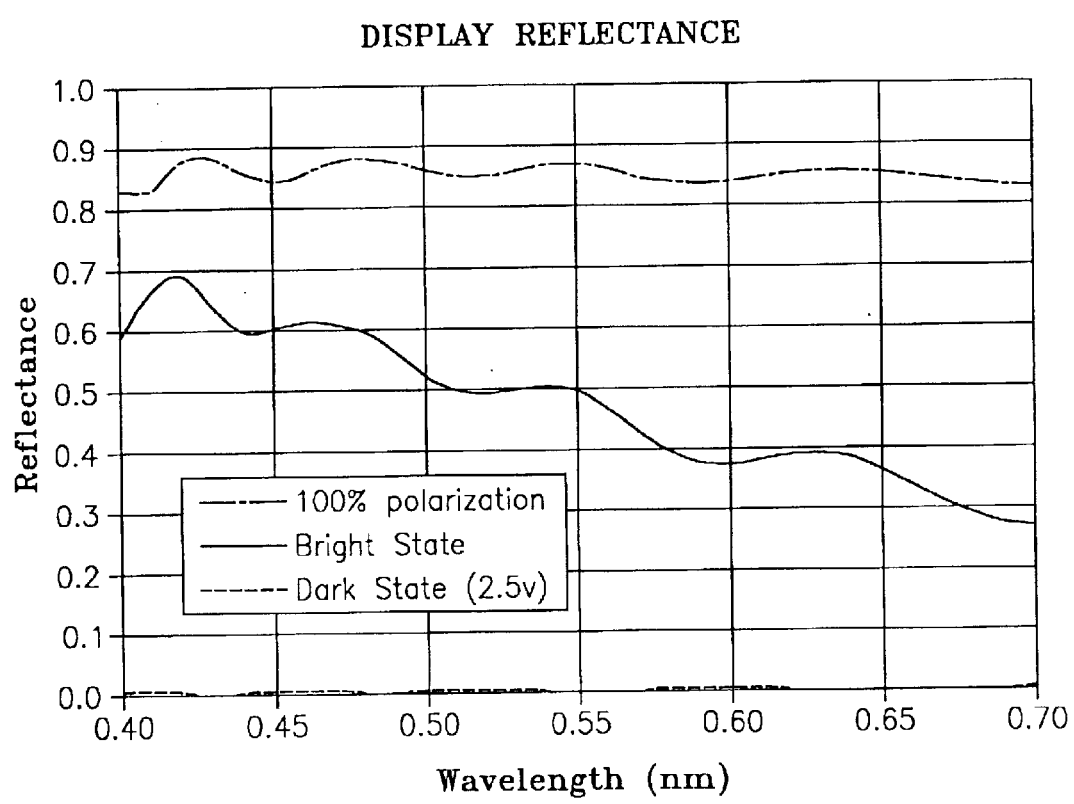
FIG. 6 is a graphical representation of the bright and dark state spectra of the near-eye mode.
Figure 7:
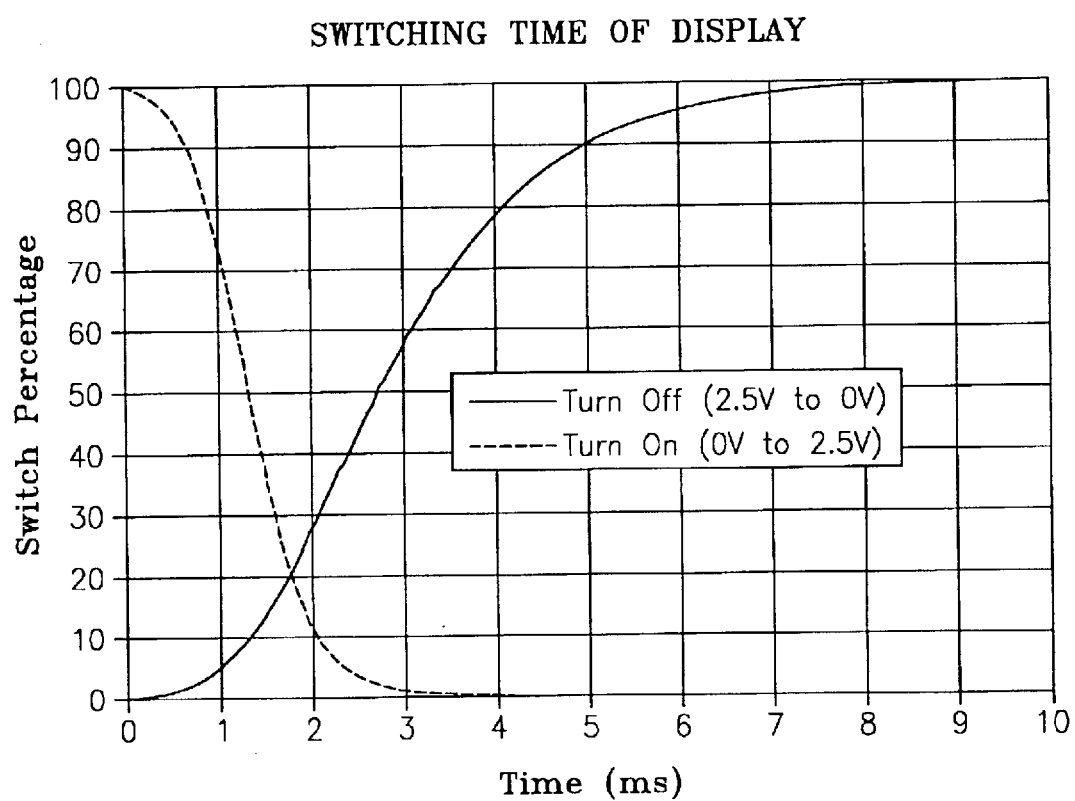
FIG. 7 is a graphical representation of the response time curves for the near-eye mode microdisplay.
Figure 8:
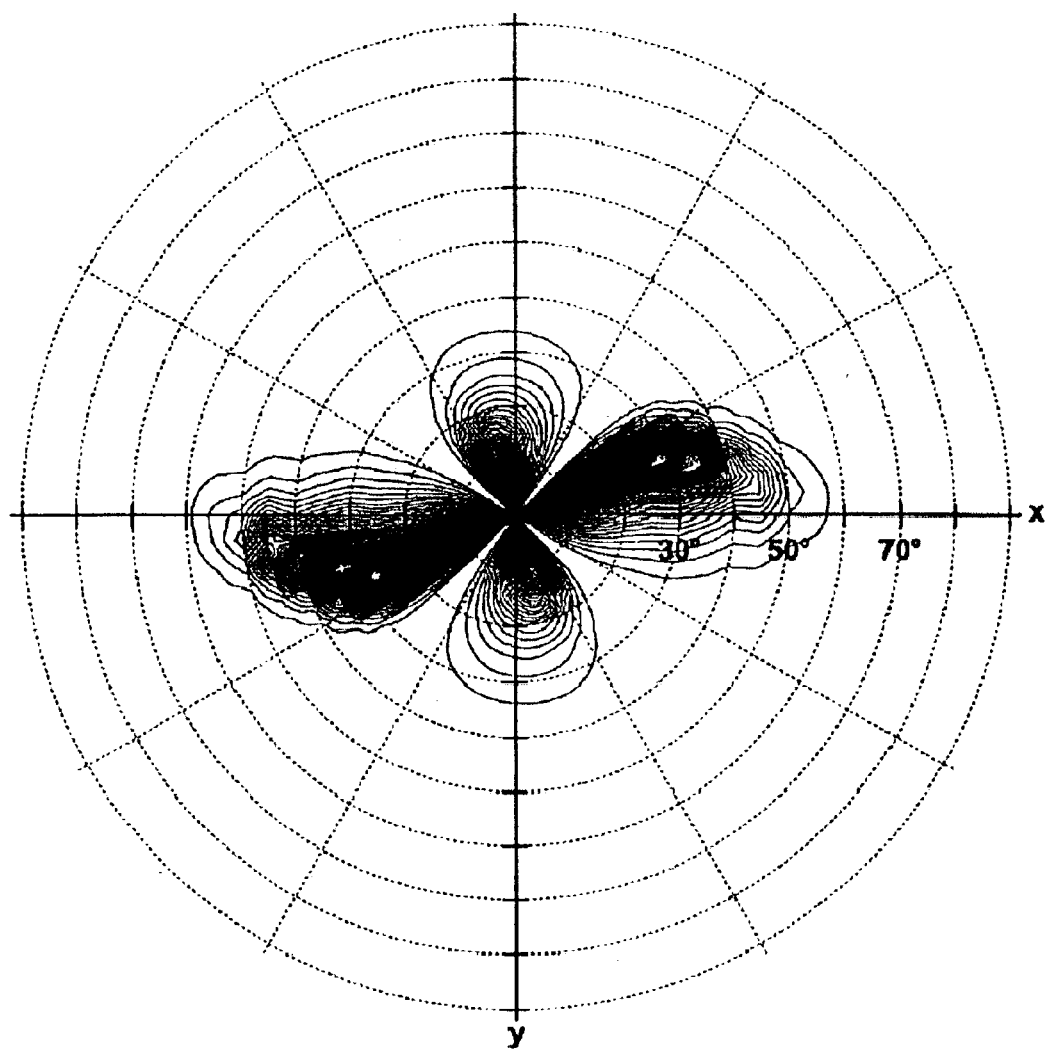
FIG. 8 is a graphical representation of the view angle properties of the near-eye mode microdisplay.
Figure 9:
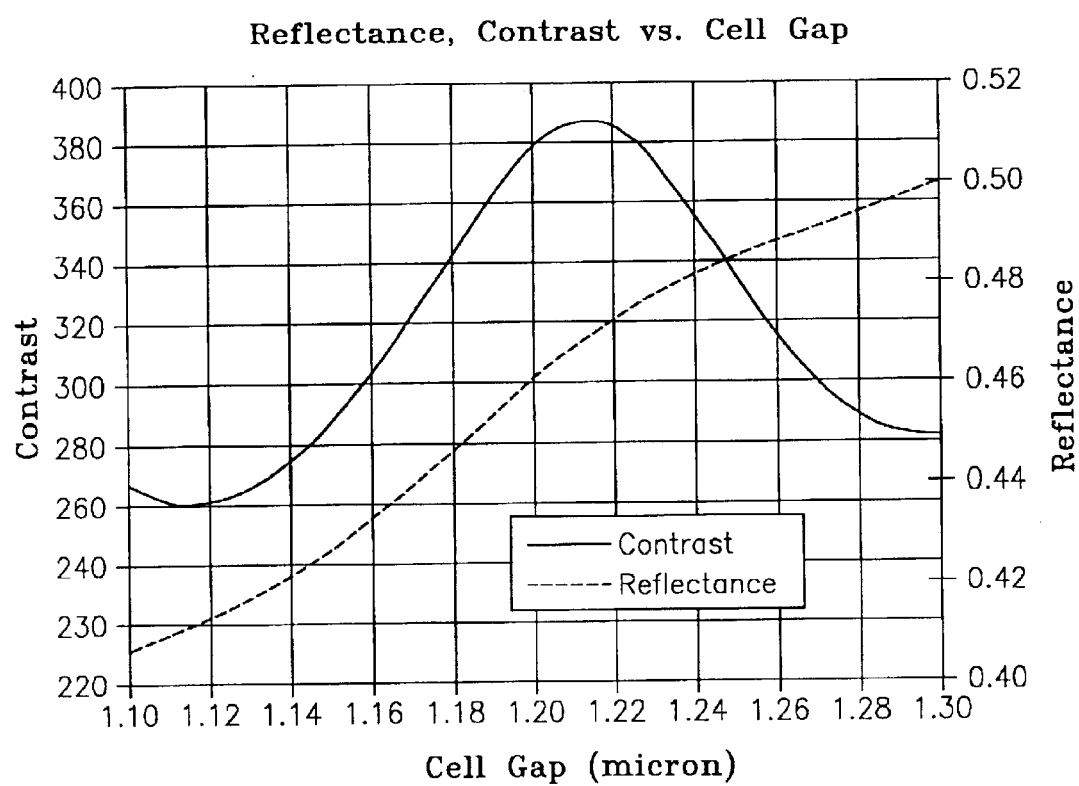
FIG. 9 is a graphical representation of the effect of the cell gap on contrast and reflectance in the near-eye mode.

In this embodiment, the cell gap is about 1.25 microns. A polarizer 92 is employed and has a direction of 0°. The measured contrast on such a display is about 110 to 1 and provides a polarization conversion efficiency of about 53.4%. The bright and dark state spectra of the near-eye mode is shown in FIG. 6. Other characteristics of the near-eye mode are shown in FIGS. 7–9. In particular, FIG. 7 shows the switching time, both turn-off and turn-on times, of the near-eye mode display. As can be seen, the near-eye mode display has a turn-off time of about 2 milliseconds and a turn-on time of about 5 milliseconds, wherein the times are measured when 90% of the liquid crystal material is switched. FIG. 8 illustrates the view angle properties of the near-eye mode, wherein it is noted that the lines are the iso-contrast lines, wherein the contrast of the outmost line is 5:1. Finally, a reflectance, contrast versus cell gap representation is shown in FIG. 9. Accordingly, both of these embodiments illustrate the advantages of employing a thin cell gap with careful selection of the twist angles. Such improved contrasts can be obtained over currently known displays along with improved response times.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A microdisplay, comprising:
   a silicon substrate having disposed thereon a first alignment layer having a first alignment direction;
   a cover substrate having disposed thereon a second alignment layer having a second alignment direction, said alignment layers facing one another to form a cell gap wherein said cell gap is about 1.2 microns ±0.2 microns; and
   a nematic liquid crystal material disposed between said silicon substrate and said cover substrate, said first and second alignment directions having about a 27 degree ±5 degree angle therebetween, wherein said liquid crystal material has a turn-on time no greater than 0.5 milliseconds and a turn-off time no greater than about 2.5 milliseconds.

2. The microdisplay according to claim 1, further comprising:
   a control system;
   an electrode disposed on said cover substrate, said electrode and said silicon substrate connected to said control system, wherein said control system sequentially applies an electric field across said cell gap to control the orientation of said liquid crystal material.

3. The microdisplay according to claim 1, wherein said first alignment direction is 53 degrees ±5 degrees with respect to an x-axis of the display, and wherein said second alignment direction in +26 degrees ±5 degrees with respect to the x-axis, which services as the polarization axis of light impinging on the display.

4. The microdisplay according to claim 1, wherein said liquid crystal material has a plurality of spacers disbursed therethrough to maintain said cell gap.

5. The microdisplay according to claim 1, further comprising:
a retarder disposed on said cover substrate.

6. The microdisplay according to claim 5, wherein said retarder has an alignment direction that is at −38 degrees ±5 degrees with respect to an x-axis of the display and wherein a midpoint of the twist angle is about 78.5 degrees ±5 degrees from said retarder's alignment direction.

7. The microdisplay according to claim 1, wherein said liquid crystal material has a turn-on time of about 0.2 milliseconds and a turn-off time of about 1.5 milliseconds.

8. The microdisplay according to claim 1, wherein the microdisplay has a contrast ratio of greater than 400:1 at F#/1.0 with white light illumination.

9. The microdisplay according to claim 1, wherein the microdisplay has a polarization conversion efficiency of at between 85% to 95%.

10. The microdisplay according to claim 1, wherein the microdisplay has a contrast ratio of at least up to 2000:1 and a polarization conversion efficiency of at between 85% to 95%.

11. A microdisplay, comprising:
a silicon substrate having disposed thereon a first alignment layer having a first alignment direction;
a cover substrate having disposed thereon a second alignment layer having a second alignment direction, said alignment layers facing one another to form a cell gap of about 1.25 microns; and
a nematic liquid crystal material having spacers disbursed therethrough to maintain said cell gap, said material disposed between said silicon substrate and said cover substrate, said first and second alignment directions having about a 95 degree ±3 degree angle therebetween wherein said first alignment direction is +80 degrees ±5 degrees with respect to an x-axis of the display, and wherein said second alignment direction is −15 degrees ±5 degrees with respect to the x-axis, which serves as the polarization axis of the incoming light.

12. The microdisplay according to claim 11, further comprising:
a control system;
an electrode disposed on said cover substrate, said electrode and said silicon substrate connected to said control system, wherein said control system sequentially applies an electric field across said cell gap to control the orientation of said liquid crystal material.

13. The microdisplay according to claim 12, wherein said liquid crystal material has a turn-off of about 2 milliseconds and a turn-on time of about 5 milliseconds, and a contrast ratio of at least 110:1.

* * * * *